US006805055B1

(12) United States Patent
Jebsen et al.

(10) Patent No.: US 6,805,055 B1
(45) Date of Patent: Oct. 19, 2004

(54) PLASMA FIRING MECHANISM AND METHOD FOR FIRING AMMUNITION

(75) Inventors: Jan Henrik Jebsen, Nyon (CH); Gerard Aknine, Nyon (CH)

(73) Assignee: Gamma Recherches & Technologies Patent SA, Nyon (CH)

( * ) Notice: Subject to any disclaimer, the term of this patent is extended or adjusted under 35 U.S.C. 154(b) by 0 days.

(21) Appl. No.: 10/603,090

(22) Filed: Jun. 25, 2003

(51) Int. Cl.[7] .................................................. C06C 9/00
(52) U.S. Cl. ...................................................... 102/205
(58) Field of Search ................................ 102/205, 470, 102/472; 89/8, 7; 42/84

(56) References Cited

U.S. PATENT DOCUMENTS

| | | | |
|---|---|---|---|
| 3,650,174 A | | 3/1972 | Nelsen |
| 3,854,231 A | * | 12/1974 | Broyles .......................... 42/84 |
| 4,640,180 A | * | 2/1987 | Rose ................................ 89/8 |
| 4,895,062 A | * | 1/1990 | Chryssomallis et al. .......... 89/7 |
| 5,115,743 A | * | 5/1992 | Loffler .......................... 102/472 |
| 5,220,126 A | * | 6/1993 | Borgwarth et al. ......... 89/28.05 |
| 5,225,624 A | * | 7/1993 | Schneider et al. ................ 89/8 |
| 5,355,764 A | * | 10/1994 | Marinos et al. ................... 89/8 |
| 5,429,030 A | * | 7/1995 | Tidman ............................ 89/7 |
| 5,503,058 A | * | 4/1996 | Marinos .......................... 89/8 |
| 5,503,081 A | * | 4/1996 | Lindblom et al. .......... 102/472 |
| 5,549,046 A | | 8/1996 | Widner et al. |
| 5,625,972 A | | 5/1997 | King et al. |
| 5,652,408 A | * | 7/1997 | Nicolas ...................... 102/499 |
| 5,898,124 A | | 4/1999 | Krumm et al. |
| 5,938,950 A | * | 8/1999 | Gay et al. ............... 219/121.54 |
| 5,945,623 A | | 8/1999 | Goldstein et al. |
| 5,988,070 A | * | 11/1999 | Krumm et al. ............. 102/430 |
| 6,032,568 A | | 3/2000 | Fuller et al. |
| 6,119,599 A | * | 9/2000 | Johnson et al. ............. 102/472 |
| 6,186,040 B1 | * | 2/2001 | Weise et al. ...................... 89/8 |
| 6,237,494 B1 | * | 5/2001 | Brunet et al. ............. 102/202.7 |
| 6,397,508 B1 | | 6/2002 | Constant et al. |
| 6,578,493 B2 | | 6/2003 | Weise et al. |
| 2001/0043638 A1 | | 11/2001 | Wittle et al. |
| 2002/0046988 A1 | | 4/2002 | Goodwin |
| 2002/0117482 A1 | | 8/2002 | Hewett et al. |
| 2002/0125224 A1 | | 9/2002 | Cook et al. |
| 2002/0185477 A1 | | 12/2002 | Hardwick |
| 2003/0034333 A1 | | 2/2003 | Horner-Richardson et al. |
| 2003/0039297 A1 | | 2/2003 | Wittle et al. |
| 2003/0042232 A1 | | 3/2003 | Shimazu |
| 2003/0047101 A1 | | 3/2003 | Folsom et al. |

OTHER PUBLICATIONS

"NC State Engineers' Research Aims at Power and Safety of Weaponry," Nuclear Engineering, North Carolina State University College of Engineereing, Nov. 6, 1997, 3 pages.
Operating Manual for Drag–Gun Plasma Cutter with Built–In Air, published by Thermal Dynamics, a Thermadyne Company, Apr. 26, 2000, 33 pages.

* cited by examiner

Primary Examiner—Michael J. Carone
Assistant Examiner—Jordan Lofdahl
(74) Attorney, Agent, or Firm—Wiley, Rein & Fielding LLP

(57) ABSTRACT

The invention comprised a device and method for firing firearm ammunition using a plasma torch generator. In a particular embodiment, the device relates to the control or management of the rate of fire and number of rounds fired in a burst firing mode for automatic firearms. The device can be incorporated into firearms of a variety of sizes and configurations to provide precise control of the rate of fire. The device and method can be applied to conventional mechanical primer ammunition or used without the need for a primer, particularly in field artillery, aircarft, and watercraft.

39 Claims, 7 Drawing Sheets

PLASMA FIRING MECHANISM AND METHOD FOR FIRING AMMUNITION

FIELD OF INVENTION

This invention relates to plasma firing mechanism for firearms, methods for firing firearms, and methods for controlling the firing of firearms. In a particular embodiment, the mechanism or device more effectively controls and/or manages the rate of fire and the number of rounds fired for automatic firearms.

BACKGROUND FOR AND INTRODUCTION TO THE INVENTION

Historically, semiautomatic and automatic weapons used mechanical percussion to fire a conventional cartridge comprising a primer or a casing containing a quantity of gunpowder or other explosive or propellant material. The casing is typically cylindrical in shape with a bullet that is initially lodged in one end of the cartridge and a primer located in the opposite end. A mechanism for detonating the primer typically includes a hammer and firing pin propelled by the force of a spring or other suitable mechanism. The movement of the hammer and the firing pin is initiated by pulling the trigger. The inertia of the hammer and firing pin introduces a time lag, sometimes called lock time, between the trigger pull and detonation of the primer. The percussion primer detonates when struck by the firing pin, igniting the gunpowder and ejecting the bullet from the cartridge under the pressure created by the expanding gases created by the exploding gunpowder.

The use of a mechanical firing pin creates a risk that the firing pin may strike the primer too hard and penetrate the primer. This creates a path for the expanding gases to escape through the breach in the primer, which reduces the pressure available to propel the bullet and increases the chance of injury to the operator or damage to the weapon. Mechanical firing systems are also subject to wear with subsequent deterioration of performance.

In order to fire multiple rounds of ammunition, a percussion and reload cycle is established, wherein the spent casing is removed from the firing chamber, a fresh round of ammunition is chambered, and the firing pin strikes the primer of the fresh round of ammunition to repeat the process. For semiautomatic weapons, the movement of the firing pin is initiated by successive pull and release of a trigger, with a single round being fired for each pull of the trigger. For automatic weapons, a single pull of the trigger causes the firing pin to strike the primer of each successive round of ammunition without further operator interaction. The rates of fire of such conventional automatic weapons generally are a function of the time it takes for the percussion and reload cycle to be completed. The length of this cycle is largely a function of the time it takes for the mechanical parts to move through their range of motion.

Once the mechanical parts and ammunition are selected for a particular firearm design, the firing rate typically is set and cannot be adjusted by the operator. Moreover, the practical maximum firing rate for automatic weapons is limited by the cycle time of the mechanical parts. This may be disadvantageous in certain circumstances because a reduced number of rounds may be placed on a fast moving target before it moves out of range of the automatic weapon, leading to a lower target hit rate.

In certain circumstances, fully automatic firing can lead to excessive ammunition use without a corresponding increase in target kill rate and, thus, the depletion of available ammunition on a particular sortie. One solution to this problem is to employ a lower rate of fire to limit the excessive use of ammunition. Alternatively, a burst firing mode can be used wherein a single trigger pull causes a set number of rounds to fire, rather than continuing to fire ammunition until the trigger is released, as is the case in conventional fully automatic weapons. The number of rounds fired in burst firing mode is typically also a function of the action of the mechanical parts of the weapon and thus cannot be varied by the operator. Because the firing of successive rounds occurs without operator interaction or control, the operator is unable in conventional systems to select the precise timing of firing any particular round or to vary the firing rate in other situations.

Other types of priming systems exist and others have been proposed, especially for large caliber artillery ammunition and aircraft and watercraft armaments. In the case of aircraft armaments in particular, one alternative to mechanical percussion is electrical percussion, which is used with electrical primer ammunition. In an electrical percussion system, the mechanical firing pin is replaced by an electrically conductive firing pin that makes good electrical contact with an electrical primer prior to initiating a firing sequence. The electrically primed cartridges have an electrically conductive portion that is grounded electrically to the walls of the firing chamber. One serious drawback of electric percussion is the requirement for specialized ammunition with embedded electrodes. Conventional primer initiated ammunition will not work in a weapon designed for electric percussion and the specialized ammunition with embedded electrodes will not work with conventional weapons. This prevents interoperability or sharing of ammunition and complicates logistics for supply of military units that employ both conventional and electric percussion weapons.

Another possible alternative to mechanical primed ammunition, particularly in the artillery context, is laser-fired ammunition. For laser-fired artillery systems, the projectile and propellant are loaded in conventional fashion, but the mechanical primer and firing pin are replaced by a laser firing system that is typically integral to the breech block of the cannon. An optical window is provided in the breech block to allow the passage of high energy, pulsed laser light into the propellant chamber to directly ignite the propellant ignition pad and fire the projectile. The laser firing system eliminates the complexity and delays caused by the loading of a mechanical primer and mechanical percussion by the firing pin. However, laser firing systems (none of which have been placed into production) are generally expensive and require considerable development and manufacturing time when compared to mechanical primer systems. In addition, the optical viewing window of the laser system must be sealed against the pressure and heat of the propellant chamber while maintaining suitable optical properties. The combination of heat, pressure, and propellant residue from the propellant chamber and the laser energy passing through the viewing window can cause clouding, obscuration, and/or pitting of the viewing window over time, resulting in degraded performance of the laser ignition system.

Thus, the firing methods used in current firearms, aircraft and watercraft armaments, and artillery suffer from a number of deficiencies. For example, the rate of fire is predetermined by the selection of mechanical parts and the type of ammunition cannot be varied once the weapon is built. Maximum ring rate for a particular type of ammunition is limited by the cycle time of the mechanical parts. Once the weapon is designed and built the operator cannot control the firing rate, timing of firing a particular cartridge, or the number of rounds fired in burst mode. For these and other reasons, improvements in the design and operation of firing systems and methods for firing automatic weapons are needed.

SUMMARY OF THE INVENTION

In one aspect, the present invention provides improved devices for varying the firing rate, precisely controlling the firing of individual rounds of ammunition, and varying the number of rounds fired in burst mode. The invention is not limited to solving any particular problem or disadvantage. In addition, the invention is not limited to use with any particular size or type of ammunition. However, the advantages made available through the invention can be used with conventional mechanical primer initiated ammunition and/ or in place of the mechanical primer and firing pin arrangement of the conventional firearm. "Firearm," as used here, encompasses artillery, handguns, pistols, heavy caliber guns, rifles, sniper rifles, guns with automatic and semiautomatic action, mountable and portable cannons, cannons mounted on motor vehicles, aircraft, watercraft or naval vessels, cannons mounted on armored personnel carriers or other armored vehicles, and machine guns or cannons mounted on armored or non-armored vehicles or vessels. The terms "firearm" and "artillery" are used interchangeably here.

One aspect of the invention is to reduce and/or eliminate the lag time between initiating a firing sequence, by pulling a trigger or by other means, and detonation of the chambered round. The invention also facilitates the design and production of a more versatile weapon and/or allows the operator to vary the firing rate to suit the particular application or target. Because detonation is caused by a plasma torch or pulse of short duration, very high firing rates can be supported. In another aspect, the plasma firing mechanisms of the invention provide robust and reliable components that can be used in a variety of ammunition systems. Thus, incorporating one or more of the many aspects of the invention into a firearm improves the control and effectiveness of the firearm.

In another aspect, the present invention operates by using a plasma torch to detonate ammunition or a primer in a cartridge to fire a bullet or projectile in a controlled fashion. The plasma torch is generated by using an arc across a gap between a cathode and an anode. A high voltage pulse, a high current pulse, and pressurized gas or air flowing between the cathode and anode extends an arc into a plasma torch capable of contacting a primer, a surface of a cartridge, and/or a propellant charge. In a preferred embodiment, more than one voltage pulse or current pulse across the cathode/ anode gap is used to significantly increase the energy of the plasma torch. The power supply may use a first generator to supply the voltage to create the initial arc and a second generator to supply the current pulse to generate the plasma torch. Alternately, a single generator capable of varying its voltage and current output may be used. Thus, one of skill in the art can substitute a variety of electrical elements to construct a suitable power supply for generating a plasma torch in accordance with the present invention.

In general, the devices and methods of the invention can function to create intense heat through the plasma torch, which can be used to cause a primer to fire, igniting the gunpowder or other primer or propellant within the cartridge, or to directly cause the propellant charge to fire. In certain operational circumstances, this will cause a bullet or projectile to be ejected and propelled along the barrel of the firearm by the expanding gases produced by the detonation.

One of skill in the art will understand that the arrangement of the anode and cathode, the voltage across the cathode/ anode gap, the current across the anode/cathode gap, the pressure of the air or gas, the duration of the pulse(s), and anode/cathode gap or configuration can be adjusted. One of skill in the art can vary the length, size, temperature, and duration of the plasma torch. By appropriate adjustment of these parameters, the plasma firing device can be used to operate a wide range of ammunition, primers, artillery cannons, naval and aircraft guns, rifles, pistols, and machine guns.

In another aspect, the present invention can be used to render obsolete the mechanical primer and firing pin arrangement for cannons and artillery or vehicle mounted weapons. This reduces the length of the percussion reload cycle by eliminating the step of inserting the mechanical primer manually or mechanically. This alone can increase the maximum allowable firing rate of the weapon and improve operator safety by eliminating the need for personnel to handle mechanical primers. In preferred embodiments of the artillery or naval gun applications, parts of the plasma torch generator are preferably integrated into the breech of the weapon, with the power supply and air supply external to the harsh environment of the propellant chamber. Once the fuzed projectile and propellant are loaded, the breech is closed and the weapon is ready to fire. When the firing sequence is initiated, the plasma torch is generated in much the same fashion as described above. The introduction of the gas and high voltage and high current pulses can be precisely timed to fire the projectile. When initiated, the plasma torch extends into the propellant chamber, igniting the propellant and firing the projectile.

The invention comprising the use of a plasma torch is simpler, cheaper, and more durable than laser ignition devices and lacks the requirement for an optical window. The plasma firing device of the present invention also eliminates the delays and safety issues associated with manual or mechanical loading of percussion primers in conventional artillery or cannons.

In yet another aspect, the invention comprises a method for firing a firearm employing a plasma torch generator as well as method for generating and/or calibrating a plasma torch to fire a primer or round. For example, the invention encompasses a method for firing a primer or propellant charge by providing a plasma torch generator, where the plasma torch generator comprises a cathode, an anode, a gas passage for allowing pressurized gas to flow between the anode and cathode, and a power source electrically coupled to the anode and the cathode. In one preferred embodiment, a first voltage is applied between the anode and cathode to cause an arc to form. Pressurized gas is applied to the arc or to the gap between the anode and cathode via a gas passage. As used here, "gas" can be some inert gas or other gas that does not interfere with the generation of a plasma torch, or it can be air. A current is then applied to generate a plasma torch, wherein the plasma torch generator is positioned so that a plasma torch is capable of contacting a primer, a surface of a cartridge or ammunition, or a propellant charge. The order of the steps listed above, or elsewhere in the methods of this invention, need not necessarily be exactly the same as written. Similarly, the invention encompasses a method for calibrating a plasma torch generator to fire a primer or propellant charge. The method can comprise altering one or more of a number of factors involved in or known to be involved in generating a plasma torch. For example, the type of cathode or anode used, the gap between the cathode and the anode, the voltage used, the pressure of the gas or air, the duration of the plasma torch, the size of the plasma torch, the temperature generated on a surface in contact with the plasma torch, can all be varied to optimize, either one factor at a time or more than one factor, to generate a desired plasma torch. One of skill in the art is familiar with method and techniques to, vary each of these factors.

As described here, a preferred embodiment of the methods or devices of the invention employs one or more plasma torch generators capable of using a 5 to 10 msec pulse of current, for example, to generate a plasma torch. Additional preferred aspects include, for example, embodiments in which one or more of the plasma torch generators or operating with one or more generators: a vortex cathode; a continuous air flow over the cathode/anode of about 3 to about 5 bar; a pressurized air supply at about 3 to about 5 bar or from about 3 to about 10 bar; an initial arc generating voltage of between about 3 kV and about 20 kV; a torch generating a current pulse, or high current pulse, of approximately 15 amps, whereby a 85 V/15 amp pulse crosses the anode/cathode gap; a power source for generating an initial arc and a separate power source for generating a current pulse; a nickel plated copper cathode; a copper anode; a torch guide; a tungsten torch guide; and ceramic insulators.

The plasma torch generator, plasma firing device, and methods of the invention can be manifested as in one of the Figures accompanying this disclosure. Also, numerous embodiments and alternatives are disclosed in the accompanying claims. Other embodiments and advantages of the invention are set forth in part in the description that follows, and in part, will be obvious from this description, or may be learned from the practice of the invention.

BRIEF DESCRIPTION OF THE DRAWINGS

For a more complete understanding of the invention and some advantages thereof, reference is now made to the following descriptions taken in connection with the accompanying drawings in which.

DETAILED DESCRIPTION OF THE INVENTION

Figure 1:
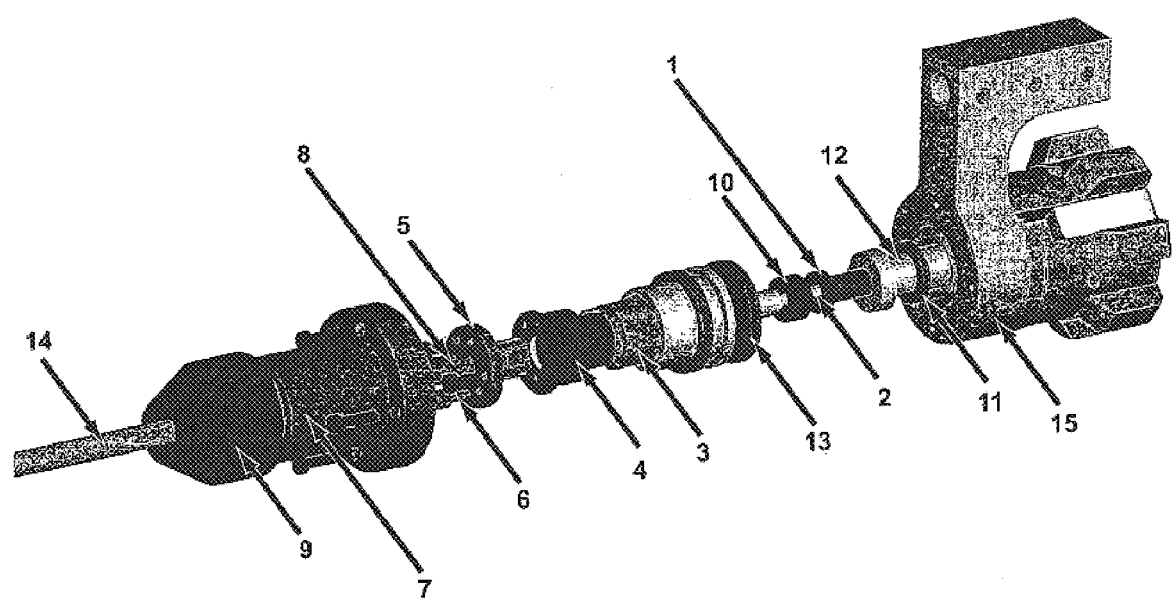
FIG. 1 shows an exploded view of a preferred embodiment of the present invention, and exemplary component parts, for use in firearms and especially with a semiautomatic or automatic firearm.

The invention can be used in a variety of firearm designs, sizes, configurations and operational settings. In small caliber embodiments, a single plasma torch generator can be used and incorporated into the frame or other part of the firearm. Thus, the invention can be used to more accurately control firing rates and burst firing modes. In heavy caliber firearms and artillery, the invention can be used to more reliably fire ammunition. As shown and explained below, a single or multiple plasma torch generators can be used, where the multiple plasma torch generators are typically synchronized to fire together.

With artillery embodiments, the invention can be used with each of the three basic types of artillery ammunition, fixed ammunition, semi-fixed ammunition, and separate loading ammunition. The ammunition is classified based on the manner in which the components are assembled for loading and firing. The present invention can be advantageously employed with each of these three types of ammunition. In fixed ammunition, the cartridge, primer, propellant, and projectile are preassembled and used as a single unit, making it impossible for the weapon operator to adjust the amount of propellant in the cartridge case. Fixed ammunition also is typically used for small to medium caliber ammunition.

Semi-fixed ammunition permits an adjustable propellant charge, by dividing the propellant into increments, or charges. Each increment of propellant is typically contained in a cloth bag. There are usually 7 increments numbered 1 through 7, each of which is a different size. All of the cloth bags may be held together by an acrylic cord and stored in the cartridge case. The primer is typically located in the base of the cartridge and is an integral part of the cartridge case. Semi-fixed ammunition may be fuzed or unfuzed and is generally used in 105 mm howitzers.

Separate loading ammunition has four separate components: primer, propellant, projectile, and fuze. The four components are issued separately and the projectile and propellant are loaded in two separate operations to prepare the cannon or howitzer for firing. Typically, the fuzed artillery projectile is loaded and rammed in the breech of the cannon chamber. Propellant charges are then loaded into the chamber. The propellant charges are conventionally provided in increments so that the quantity of propellant can be readily varied to adjust the distance and height of the projectile's flight path. The mechanical primer then is inserted into the breech block, either by hand or by mechanical means. On firing, the firing pin mechanism impacts the mechanical primer, which detonates and extends a flame into the propellant chamber that ignites the propellant and fires the projectile. The use of mechanical primers in artillery delays the percussion and reload cycle by introducing additional steps to the loading process. Although semi-automatic and even automatic processes for mechanical primed artillery firing have been developed, their maximum rate of fire is limited in part by the time required to manually or mechanically load the mechanical primer and to initiate the mechanical firing sequence.

The invention allows the use of conventional mechanical primer ammunition for improved interoperability with existing firearms, and thereby simplifies the supply requirements for military operations that employ both plasma fired and mechanically fired firearms. For artillery cannons and naval guns, the present invention replaces the mechanical primer and firing pin of conventional mechanisms. This eliminates the safety issues and time delay caused by manual or mechanical loading of mechanical primers.

Terms such as "under," "over," "in front of," "the back of the gun," or "behind," "anterior," "posterior," or "transverse," are used here as somebody firing a gun or firearm would understand them, which is by reference to the longitudinal or firing axis of the barrel when the firearm is held or positioned in the usual horizontal attitude.

In one preferred embodiment, the present invention may be used as a plasma firing device in conjunction with conventional mechanical primed ammunition. FIG. 1 shows an exploded perspective of a preferred embodiment of the present invention for use with a semiautomatic or automatic firearm. Anode (1) surrounds vortex cathode (2). The anode and vertex cathodes are electrically connected to a power supply (not shown). The anode contact (3) makes electrical contact with the anode and the power supply to cause an arc to form across the anode/cathode gap. The cathode insulator (4) prevents a short circuit between the anode and the vortex cathode. Connector (5) provides holes to permit air flow from the gas supply via gas passage (8) to the anode cathode gap. Cathode connector (6) provides a path for electrically connecting the vortex cathode to the power supply. Cover (7) attaches to transporter assembly (15), which can be attached to the bolt head, to enclose the anode/cathode assembly and to prevent the escape of high-pressure gas from the gas supply. Gas passage (8) provides a conduit for high-pressure gas to flow from the gas supply (14) to the anode/cathode gap.

Figure 2:
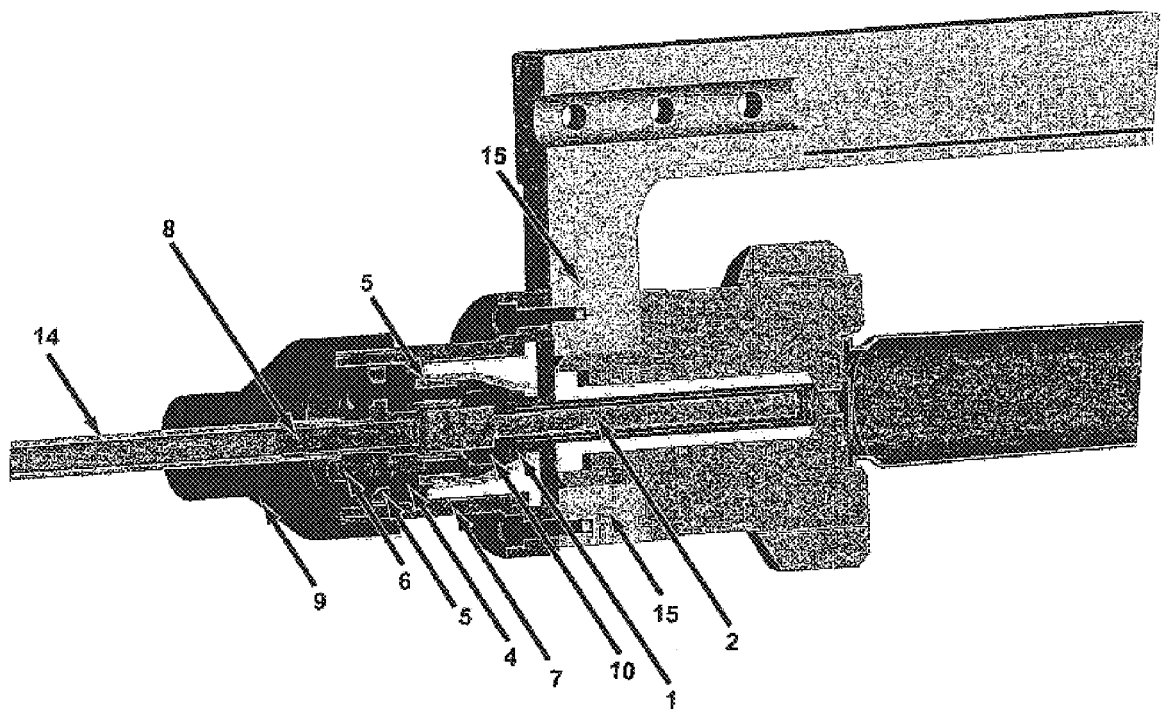
FIG. 2 shows a cutaway side view of the embodiment of FIG. 1.
Figure 3:
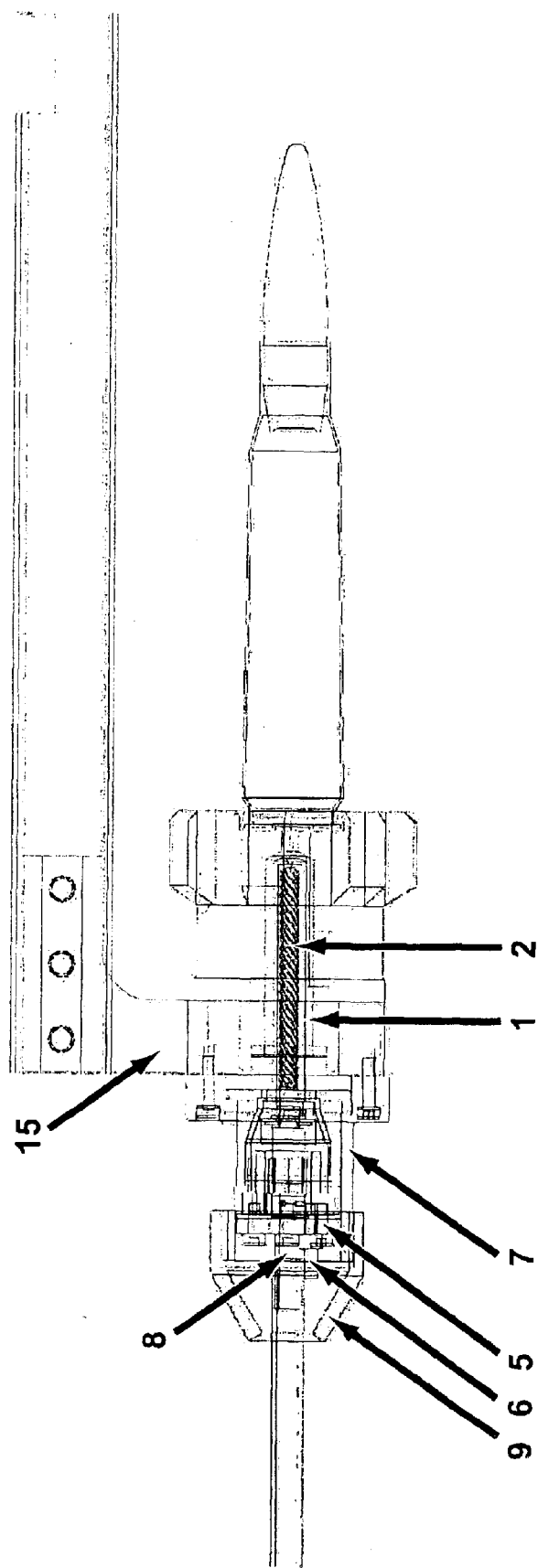
FIG. 3 shows a cutaway side view of the embodiment of FIG. 1 with a cartridge in place and ready to be fired.

Preferably, the gas used is high-pressure air. Other gases, for example Argon or Nitrogen, can be used. Air flow preferably is continuous to protect the components from discharge gases reentering the mechanism and fouling the cathode/anode air flow. Air flow can also be used to, or can function to, cool the anode and cathode or insulators. In this embodiment, the cathode, the anode, and the gas passage preferably are integral to the transporter assembly and bolt head used to chamber a mechanically primed cartridge. FIGS. 1, 2, and 3 show an embodiment integrated into a bolt head of a firearm as describe in copending U.S. application Ser. Nos. 10/454,785, 10/454,780, or 10/454,778, which are specifically incorporated herein by reference in their entirety. A brace (9) encloses a cable to provide a connection to the power supply (not shown) as well as a cover to seal gas within the mechanism. Air flow distributor (10) serves to direct air flow from connector (5) to vortex cathode (2), which is shaped to cause the air to swirl in a vortex around the vortex cathode and out through the anode/cathode gap toward the primer of a chambered cartridge. Gasket (11) and gasket (13) provide additional seals to prevent the escape of air pressure from the mechanism. Insulator (12) isolates the anode from the transporter assembly (15) and bolt head, both of which are typically constructed of conductive metal materials that could potentially serve as an electric ground for the anode. The transporter assembly and bolt head contain an aperture for accommodating the plasma firing device of the present invention.

In one embodiment, the plasma torch can be generated by first causing an arc to form across a gap between a cathode (preferably a vortex cathode) and an anode. In one example, 3 kV to 20 kV across the anode/cathode gap generates an arc, but many other voltages or methods can be selected. The voltage can be applied across the anode/cathode gap for a specific period of time. A current pulse or high current pulse from a power source to the cathode/anode gap and pressurized gas or air flowing between the cathode and anode generates a plasma torch, or extends the plasma arc into a plasma torch, which plasma torch is capable of contacting a primer. The intense heat of the plasma torch causes the primer to detonate, igniting the gunpowder or other propellant within the cartridge and causing the bullet or projectile to be ejected from the cartridge and propelled along the barrel of the weapon by the expanding gases produced by the detonation. Air flow preferably is continuous to protect the components from discharge gases reentering the mechanism and fouling the cathode/anode air flow. Air flow can also function to cool the anode and cathode or other components. Successive rounds in automatic fire or burst mode are fired by repeated application of high current pulses. In alternative embodiments, the air flow can be applied intermittently as pulses of high pressure air that are synchronized with the high current pulse, which slows the depletion of the gas supply and reduces the amount of high pressure gas that must be stored on a mobile weapon for a given ammunition load.

FIG. 2 shows a cutaway view of the embodiment of FIG. 1 integrated into a transported assembly (15) for a moveable bolt head. The cylindrical chamber is also shown to the right of the end of vortex cathode (2). The positioning of the cathode/anode gap allows a plasma torch generated to contact a cartridge shell, or its primer, loaded into the chamber through the aperture in the bolt head. The intense heat of the plasma torch detonates the primer or propellant charge.

FIG. 3 shows a cutaway side view of the embodiment of FIG. 1 with a cartridge in place and ready to be fired. The components are as labeled in FIGS. 1 and 2.

In a preferred embodiment, more than one pulse across the cathode/anode gap is used to significantly increase the energy of the plasma torch and direct its position. The power supply may use a first generator to supply the voltage to create an initial arc and a second generator to supply the current to generate the plasma torch. Alternately, a single generator capable of varying its voltage and current may be used. Thus, one of skill in the art can substitute a variety of electrical elements to construct a suitable power supply for generating a plasma torch in accordance with the present invention. In the two generator embodiment, a first generator is energized to apply a voltage across the anode/cathode gap, generating an arc. The voltage is preferably between about 3 kV and about 20 kV. A current of about 15 amps, which also produces about 85 volts, generates a plasma arc. A range of currents can be used beyond the approximately 15 amps of current exemplified here, as one of skill in the art understands. When a firing sequence is initiated, a gas supply applies high pressure gas through the gas passage to extend the plasma arc into a plasma torch that extends towards a mechanical primer or to a cartridge or propellant charge. The pressure of the high pressure gas is preferably between about 3 to about 5 bars. The second generator is a high voltage generator that is synchronized with the flow of gas from the gas supply. Shortly after the high-pressure gas is introduced, the second generator is energized to apply approximately 15 amps from cathode to anode for a short duration, preferably about 10 msec. This results in a high temperature plasma torch that extends from the gap between cathode and anode. The plasma torch can be directed by optional torch guides that operate to split the plasma torch into more than one torch or to direct the torch to a particular surface on the cartridge. In one example, the intense heat of the plasma torch detonates the mechanical primer causing it to extend a flame into the gun powder or propellant loaded in the mechanically primed cartridge. This ignites the gun powder or propellant. In another example, the intense heat of the plasma torch ignites the primer when the plasma torch contacts the surface of the cartridge at a point other than the primer, such as a point adjacent to or near the primer. The transfer of the heat through the cartridge can then detonate the primer. Other examples may use ammunition that does not comprise a primer.

As will be recognized by one of skill in the art, the pressure of the gas and the duration of the voltage and/or current pulses can be adjusted to vary the characteristics of the plasma torch, including its diameter, its length, and its temperature as well as its duration. By advantageous selection of these parameters, the present invention can be utilized as a plasma firing device for a wide variety of mechanical primers associated with different calibers and types of ammunition and firearms.

The present invention is not limited to any particular arrangement of the displayed components. For example, one of skill in the art will recognize that the gas supply and power supply can be mounted to move along with the bolt head during the successive firing of cartridges, or can be located external to the moving parts of the weapon, for example integral to or attached to the frame of the weapon, without deviating from the present invention. The gas supply can be arranged to permit gas flow when the bolt head is in the breech closed position and the power supply can be arranged to make electrical contact when the bolt head is in the breech closed position, without requiring either supply to move with the bolt head throughout its range of motion.

The firing sequence may be initiated by the conversion of the mechanical pull of a conventional trigger to an electrical impulse that initiates the flow of high pressure gas and the high voltage pulse to detonate the mechanical primer. Alternately, an electrical trigger control system can be utilized to initiate the firing sequence based on appropriate operator input, either locally or remotely. Because the firing sequence can be controlled to not take place until the gas and high voltage pulse are applied, the electrical trigger control system can control the precise timing of firing of an individual round. Once the high pressure gas is initiated, it preferably is applied continuously, permitting the firing of successive cartridges to be controlled by the successive application of current pulses. Once initiated, air flow can be stopped either manually by the operator, or automatically after a preset duration has passed without firing.

In an automatic weapon equipped with the present invention, the firing of each successive cartridge is independent of the mechanical ejection and reload cycle. The maximum firing rate of such an automatic weapon is dependent on the time required to eject a spent round and reload a fresh cartridge, but would not be limited by any delays caused by the displacement of conventional firing pin and hammer mechanisms. Thus the present invention permits higher maximum rates of fire. Moreover, an electrical trigger control system can be used to vary the actual rate of fire of the weapon from the maximum rate of fire to any desirable lower rate of fire to limit ammunition depletion or to prevent overheating of the weapon. The electrical trigger control system also can be used to fire in burst mode, wherein a predetermined number of rounds is fired for each operator input, either in the form of a mechanical trigger pull or electrical firing input. It therefore is possible for the operator to select the number of rounds to be fired in burst mode as well as to adjust that number in the field. The present invention can be used with any manner of electrical trigger control systems, including personal identification systems that prevent the firing of a weapon by an unauthorized individual.

Figure 4:
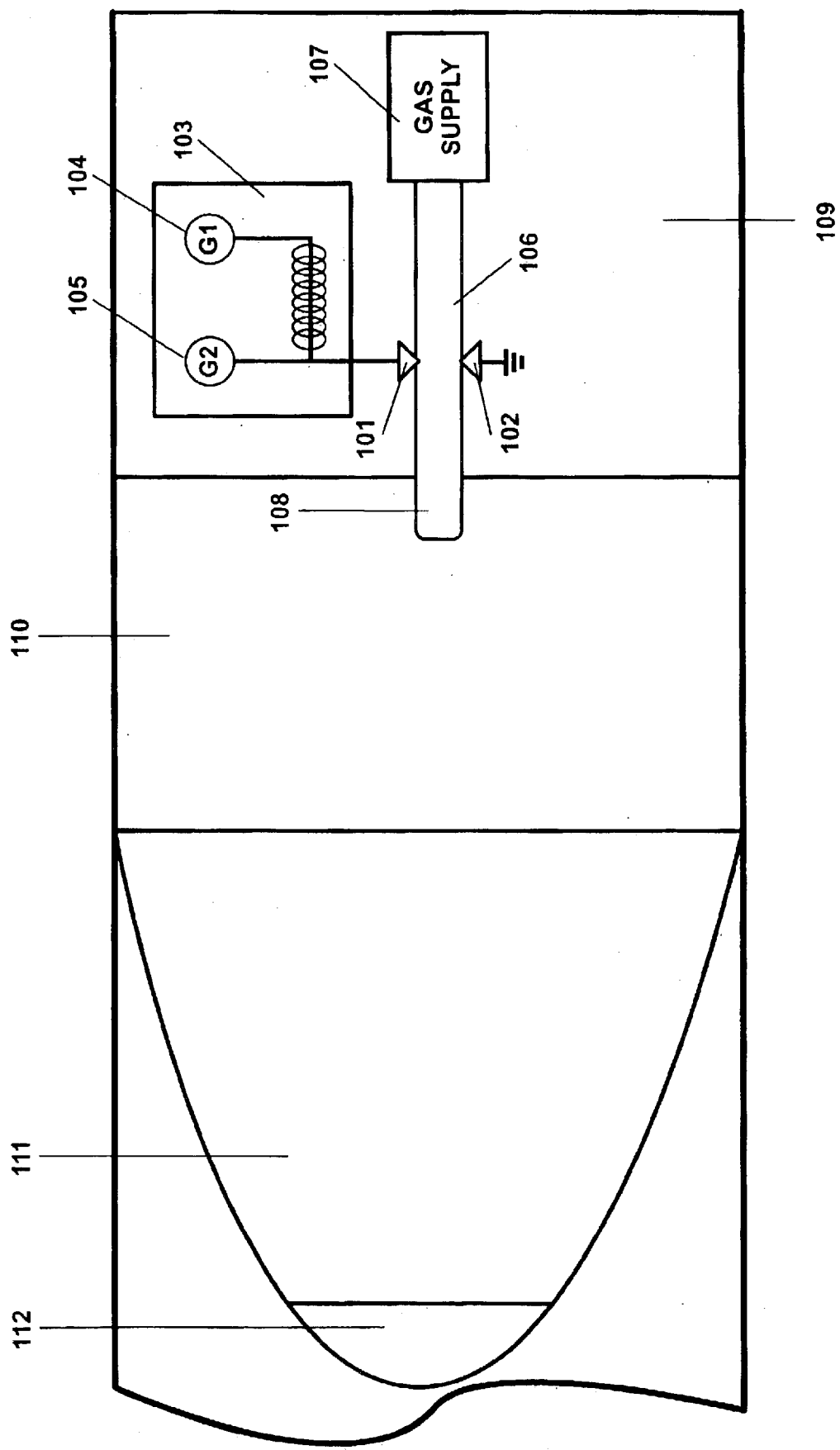
FIG. 4 shows a schematic diagram of a plasma firing device.

The diagram of FIG. 4 exemplifies the components of the plasma torch generator in conjunction with a firearm breech. The embodiments possible from the teaching here and specifically the components of FIG. 4 can be used in a number of firearms. However, in another preferred embodiment, the present invention can be used in conjunction with an artillery cannon or naval gun. In one of the embodiments possible from FIG. 4, the plasma firing device or plasma torch generator of the present invention may be installed integral to the breech (109) of an artillery cannon. In this embodiment, no mechanical primer is required and the potentially dangerous step of manually or mechanically installing a mechanical primer once the fuzed projectile (111) and propellant (110) have been rammed into the breech is no longer necessary. The components of the plasma firing device of FIG. 4 are much the same as for the embodiment of FIG. 1, including the cathode (101), the anode (102), the power supply (103) comprising the first generator G1 (104) and the second generator G2 (105), the gas passage (106), and the gas supply (107). As noted, G1 and G2 can be one or more power sources capable of generating more than one current and/or voltage pulse. The gas passage (106) of the plasma torch is integral with the breech of the cannon. When the breech is closed, a gas passage (106) provides a path for the plasma torch from cathode (101) and anode (102) into propellant chamber (110). In this and other embodiments of the invention, the gas can be used as a continuous or intermittent gas supply to generate a plasma torch as well as to cool the component parts and/or to direct the plasma torch out the orifice in the desired direction, i.e. toward the primer surface or other ammunition or propellant charge.

A first generator (112) is energized to generate a first voltage, preferably about 20 kV, from cathode (101) to anode (102) just as for the embodiment of FIG. 1. When the firing sequence is initiated, by any suitable mechanical or electrical method, the gas supply (107) initiates the flow of high pressure gas through the gas passage (106) to extend the plasma arc into a plasma torch (108) that extends towards propellant chamber (110). In some embodiments, the pressure of the high pressure gas is preferably between about 3 to about 5 bars. The second generator (105) can be a high current generator that is synchronized with the introduction of high pressure gas from the gas supply. Shortly after the gas is introduced, second generator (105) is energized to apply approximately 15 amps from cathode to anode for a short duration, with a minimum of preferably about 5 msec. This results in a high temperature plasma torch (108) that extends to the propellant chamber (110). The intense heat of the plasma torch will ignite the propellant or fire a primer. The pressure of the gas and the duration of the current can be adjusted to vary the characteristics of the plasma torch, including its diameter, its length, and its temperature as well as its duration to advantageously adjust the plasma firing device for use with various projectile sizes and propellant loads. As in the embodiment especially for semiautomatic or automatic weapons as in FIG. 1, air flow preferably is continuous for the artillery embodiment, which protects the components from discharge gases reentering the mechanism and fouling the cathode/anode and/or the air flow. Air flow can also be used to cool the anode and cathode. Successive rounds in automatic fire or burst mode are fired by repeated application of current pulses. Once initiated, continuous air flow can be stopped either manually by the operator, or automatically after a preset duration has passed without firing. Alternately, the air flow can be applied intermittently as pulses of high pressure air that are synchronized with the high voltage pulses, which slows the depletion of the gas supply and reduces the amount of high pressure gas that must be stored on a mobile weapon for a given ammunition load, particularly for relatively low rates of fire.

Figure 5:
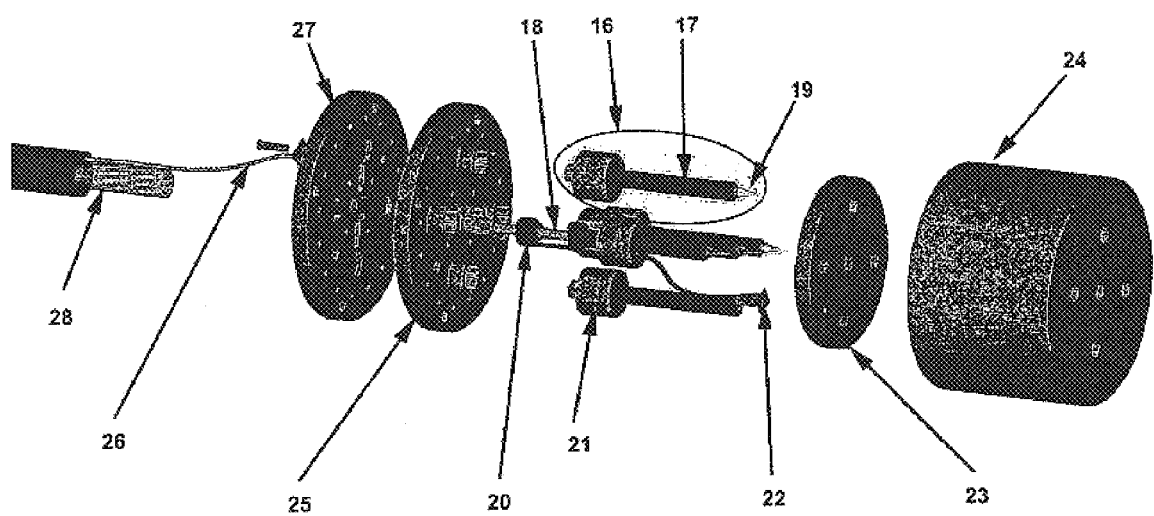
FIG. 5 shows an exploded view of a multi-probe embodiment of the invention, and exemplary component parts, for use in firearms and especially heavy artillery.

FIG. 5 depicts the component parts in an exemplary multi-probe embodiment, where more than one plasma torch generator is used to fire a primer or propellant charge. In general, the multi-probe embodiment can be multiple plasma torch generators as described here in FIG. 1, positioned to be capable of simultaneously firing the same primer or propellant charge. Alternatively, the electrical connections can be modified to accommodate multiple cathode/anode combinations, as in FIG. 5.

In FIG. 5, the plasma torch head unit (16) is presented in a five-probe environment. Each head unit contains an anode (17) and a cathode (18), for example a vortex cathode. The plasma torch (19) is shown exiting an orifice in the head unit. A cathode air flow distributor (20) and cathode insulating screw box (21) are located at the base of the head unit. The anode electrical terminal (22) is shown in position connected to the anode. The cathode electrical terminal (26) is shown at the cable, where anode electrical terminal (not shown) will also be present, in combination with gas or air supply tube (28). A plate (27) includes air flow apertures for distributing the pressurized air or gas to each plasma head unit. Plate (25) distributes electrical pulse to each plasma head or plasma head cathode. Plates (25) and (27) can function as airflow distributors and as electrical connections or conduits. Generally, insulators can be included to protect the component parts. Preferably, insulators are ceramic insulators or comprise ceramic materials. A plate (23) connects with terminal (22) to link multiple anodes, whereby voltage and/or current pulse can be distributed to each anode. Cover (24) positions plasma head units and provides thermal insulation and structural stability to the assembly as a whole. The use of plates to distribute an electrical pulse as shown here can more reliably generate equal or relatively equal potentials across each cathode/anode gap, which in turn would generate more consistent plasma torches.

Figure 6:
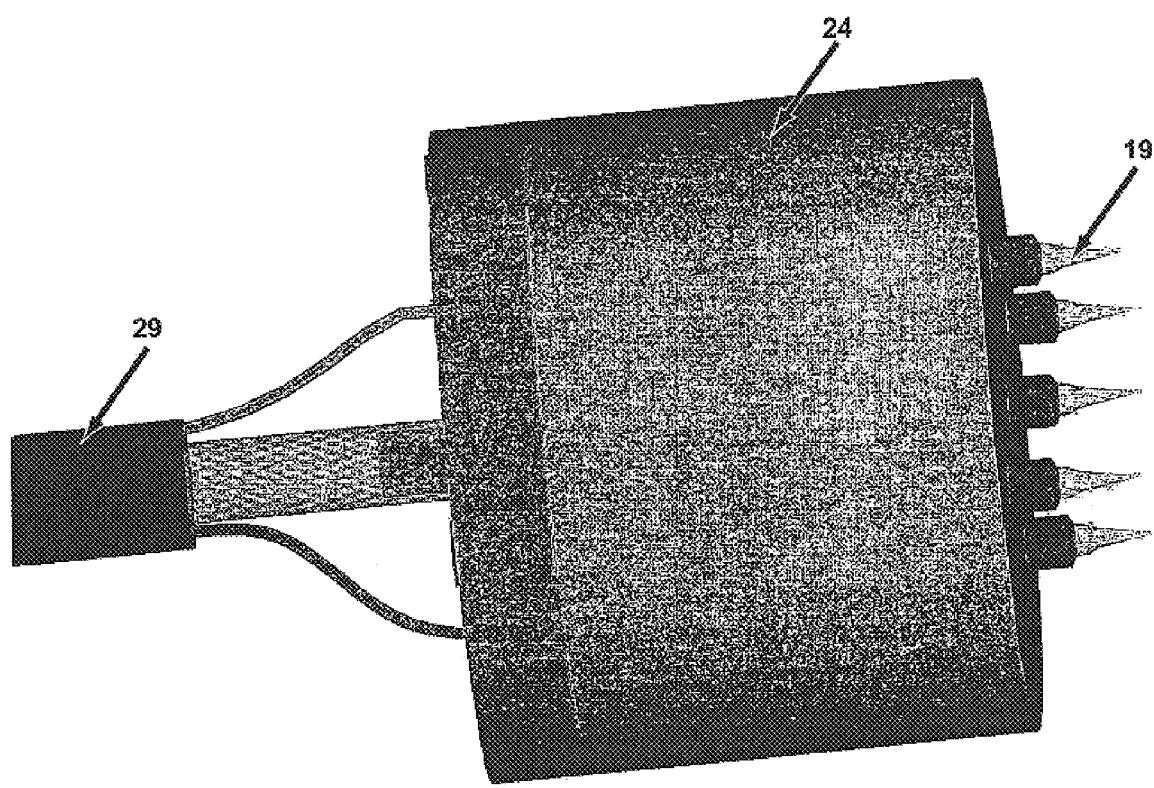
FIG. 6 shows the embodiment of FIG. 5 in assembled form.

FIG. 6 depicts a multi-probe assembly as in FIG. 5 or as can be prepared using multiple embodiments as in FIG. 1. The plasma torches (19) are shown exiting the cover (24). Cable (29) houses the electrical connection from the power source(s) to the anodes and cathodes as well as the air or gas supply tube. The assembly or device of FIG. 6 can be inserted into a receiving element in artillery or designed as an integral part of a firearm. The multi-probe examples of FIGS. 5 and 6 can be used in large caliber gun, cannon, or artillery settings, such as 105 mm, 120 mm, or 155 mm ammunition.

Figure 7:
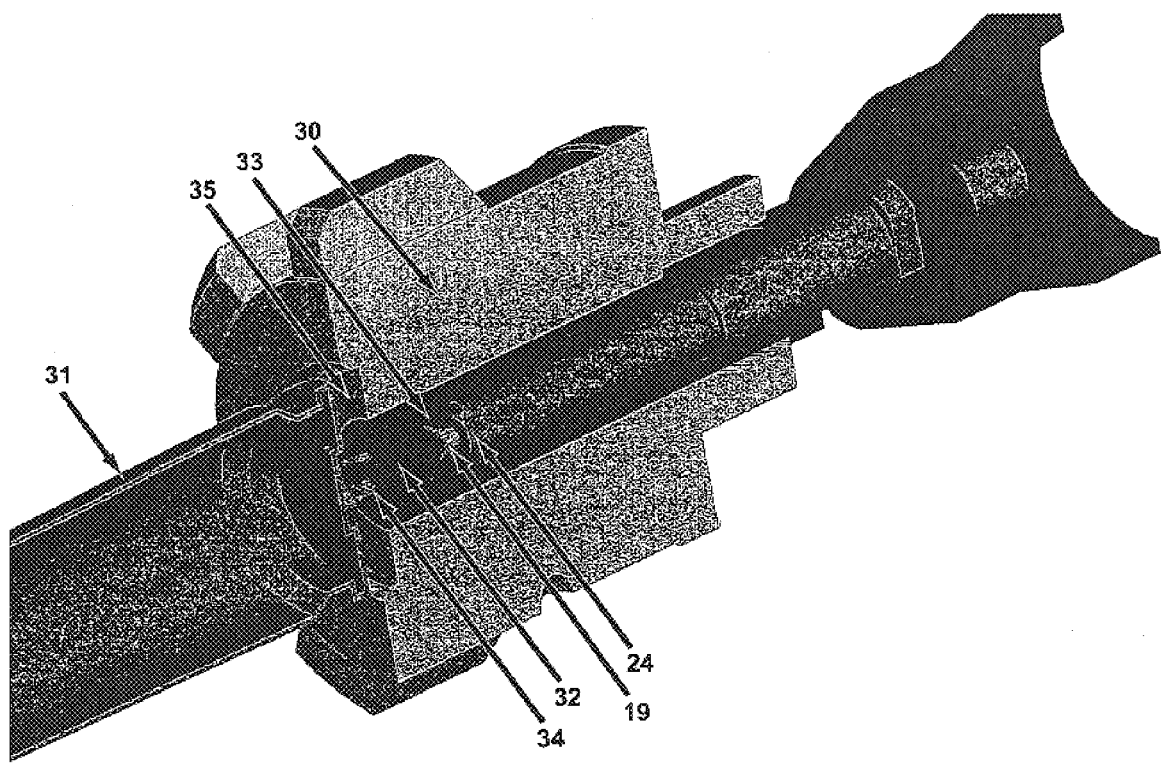
FIG. 7 shows a cutaway view of a plasma torch generator placed inside a bolt head, with a plasma torch guide directing the plasma torch toward a surface on a chambered cartridge.

FIG. 7 depicts another preferred embodiment of the invention, where a torch guide functions to separate the plasma torch and direct it to particular surface area(s) on a shell, cartridge, or other part of an ammunition component or increment. The embodiment of FIG. 7 shows a cutaway view of the cover of a plasma torch head (24) inserted into a bolt head (30). In this case, there is one plasma torch head, however, this same embodiment can be used with the multi-probe embodiment. A plasma torch (19) is shown extending into a gap (33) and through a torch guide (32). The torch guide is prepared from material capable of very high temperature contact and a preferred material is tungsten. In this case, the torch guide is cone-shaped. Any appropriate shape that can fit into the bolt head and allow the torch to extend through it can be selected. The torch guide contains one or more apertures (34) that direct the plasma torch. In this case, the plasma torch is directed toward a surface on a cartridge (31). The contact surface of the bolt head (35) contacts the chambered cartridge. In FIG. 7, the torch guide (32) directs the plasma torch into four torches that contact the cartridge at a surface point near the primer, but not directly on the primer. This configuration prevents damage to the primer, where damage to the primer may allow blowback and damage to the firearm, bolt head, plasma head unit, or the operator. Alternatively, the torch guide can direct the plasma torch to contact the primer area.

The following Examples, and foregoing description, are intended to show merely optional configurations for the devices of the invention. Variations, modifications, and additional attachments can be made by one of skill in the art. Thus, the scope of the invention is not limited to any specific Example or any specific embodiment described herein. Furthermore, the claims are not limited to any particular embodiment shown or described here.

In an exemplary method for firing a primer or ammunition, the primer and cartridge from 0.50 caliber ammunition is used. For testing purposes, the cartridges did not contain bullets or gun powder/propellant, so that the effect on the primer detonation could be more carefully studied. The cartridge is held securely by a mock bolt with an aperture for the plasma mechanism. A modified Thermal Dynamics, (West Lebanon, N.H., USA) Drag-Gun Portable Plasma Cutting System with built-in air compressor is used. A range of voltage and current settings can be evaluated for optimum firing control, such as speed of firing, length of plasma arc, temperature of plasma torch or contact surface, effect on primer, and effect on cartridge. Other parameters can also be evaluated. In addition, the gas or air flow over the plasma mechanism can also be varied for any preferred combination of voltage/current. A conventional trigger mechanism or control switch can be used to activate the plasma torch, as described for the Drag-Gun product or other available plasma torch device (see, for example, http://www.thermodyne.com or http://www.thermadyne.com/tdc/literature/index.asp?div=tdc). Of course, one of skill in the art is familiar with ways to modify the trigger or control switch device to provide, for example, multiple voltage and current pulses for each trigger activation. A trigger in parallel with the conventional hand switch of the Drag Gun can also be used. The trigger or control switch activation to generate a plasma torch can alternatively be called an operator firing input. Additional operator input can cease the control switch from generating successive plasma torches. In this and other embodiments of the invention, a conventional DC current can be used, although certain embodiments can use AC current.

For a 15 Amp setting, a range of voltages were used to fire the 0.50 caliber primer using air pressure at 5 bar and a cathode/anode gap of approximately 0.625 mm. The device is modified to expel a continuous air pressure of 5 bar and to vary the power output. Voltage settings between 10 V and 100 V/15 A are tested. At 100 V, the primer is completely destroyed and the plasma torch temperature reaches a point that could damage the plasma torch generator mechanism. Holes in the primer casing or the complete destruction of the primer casing indicates the heat is too high for safe operation, as the propellant explosion could move though hole in primer casing to damage firearm or injure operator. For voltages at the lower end of the test range, the firing time measures up to 100 msec. For a selected optimum firing time of 10 ms, the combination of 85 V/15 A at 5 bar pressure produces the most efficient firing. Firing time, temperature, and an inspection of the primer condition after firing can be factors in optimizing the apparatus for a desired setting or use. Also, as shown in the Figures, multiple plasma torches or a plasma torch divided into multiple torches through a torch guide can be used or modified so that the torch(es) contact a desired surface on a cartridge or component of the ammunition. Keeping in mind that, typically, a primer charge fires at approximately 380 degrees C., one or more surface points adjacent to the primer can be contacted with the plasma torch(es) and fire the primer, if desired. Alternatively, ammunition without a primer can be used.

Using the same or similar methods, a number of parameters can be modified. For example, at a higher air pressure of 10 bar, the cooling effect of the air can allow a 100 V/15 A combination. Also, the 85 V/15 A combination can be used with 3 bar pressure, although 5 bar produces the optimum results. Altering the air pressure can effect the both the cooling of the apparatus and the amount of discharge damage the apparatus is subject to for a given ammunition. Likewise, if different firing time parameters are selected, the voltage/current and air pressure combinations can also be modified. As one of skill in the art would understand, the optimum parameters for firing a 0.50 caliber primer would likely be different than the optimum parameters for a 105 mm cartridge or any other primer or ammunition. Nevertheless, the same principles described and demonstrated here apply to other size ammunition. The same can be said of the selection of the size of the cathode and anode. Here, we exeplify the preferred 20 kV high voltage pulse. However, a different voltage can be selected. For example, a voltage pulse from about 3 kV to about 20 kV can be selected to create the initial arc. Thus, from the information provided here, one of skill in the art can modify a number of the component parts, parameters, and firing conditions to arrive at an appropriate combination of cathode and anode combination, cathode/anode gap, number of cathodes and anodes, temperature, firing time, air pressure, and voltage and/or current settings and pulses.

One skilled in the art can devise and create numerous other examples according to this invention. Examples may also incorporate additional firearm elements known in the art, including muzzle brake, multiple barrels, blow sensor, barrel temperature probe, and targeting systems, for example. One skilled in the art is familiar with techniques and devices for incorporating the invention into a variety of firearm designs and examples existing or available, with or without additional firearm elements know in the art, and designing firearms that take advantage of the improved firing rate control, burst control, and enhanced safety features of the present invention. The invention is in no way limited by the scope of the examples, disclosure, or claims herein.

What is claimed is:

1. A method for firing a primer or propellant charge, comprising:
   providing a plasma torch generator comprising a cathode, an anode, a gas passage for allowing pressurized gas to flow between the anode and cathode, and a power source electrically coupling the anode and cathode;
   generating an arc between the anode and cathode;
   providing pressurized gas to the arc via the gas passage; and
   applying a current between the anode and cathode to generate a plasma torch,
   wherein the plasma torch generator is positioned so that a plasma torch is capable of contacting a primer, cartridge, or propellant charge.

2. The method of claim 1, wherein the gas is provided in a continuous flow.

3. The method of claim 1, wherein the gas is provided as a pulse of gas.

4. The method of claim 1, wherein an approximately 20 kV voltage is used to generate an arc.

5. The method of claim 1, wherein a voltage between about 3 kV and about 20 kV is used to generate an arc.

6. The method of claim 4, wherein the duration of the current is between about 5 millisec and about 30 millisec.

7. The method of claim 4, wherein the duration of the current is between about 5 millisec and about 10 millisec.

8. The method of claim 4, wherein the gas is provided during the same time period that the current is applied.

9. The method of claim 1, wherein the power source comprises a first generator for generating an arc using a voltage pulse and a second generator for applying the current.

10. The method of claim 1, wherein more than one plasma torch generator is provided.

11. The method of claim 4, wherein more than one plasma torch generator is provided.

12. The method of claim 1, wherein the rate of firing of the plasma torch is controlled by the current applied from the power source.

13. The method of claim 1, wherein the current used is about 15 amps.

14. A plasma firing device for use with a firearm comprising:
   a vortex cathode;
   an anode;
   a gas passage for pressurized gas to flow between the cathode and the anode;
   a gas supply for supplying gas to the gas passage; and
   a power source electrically connected to the cathode and the anode for generating a plasma torch,
   wherein a plasma torch generated between the cathode and anode is capable of contacting a cartridge, primer, or propellant charge loaded into the firearm.

15. The device of claim 14, wherein the plasma torch fires the firearm by detonating a mechanical primer.

16. The device of claim 14, wherein the plasma torch fires the firearm by detonating a propellant charge.

17. The device of claim 14, wherein the power source comprises two generators.

18. The device of claim 14, wherein a first generator is capable of providing a voltage to cause an arc to form between the anode and cathode.

19. The device of claim 14, wherein a second generator is capable of providing a current between the anode and the cathode to generate a plasma torch.

20. The device of claim 14, wherein the power source is capable of providing a current of between about 5 to about 30 milliseconds in duration.

21. The device of claim 14, wherein the gas supply is capable of providing pressurized gas at about 3 to about 10 bar.

22. A firearm comprising:
   a chamber for accommodating a projectile and a propellant charge;
   a breech operably connected to the chamber, wherein the breech prevents the escape of gases from the detonation of the propellant charge when closed; and
   a plasma firing device connected to the breech for generating a plasma torch to detonate the propellant charge, the plasma firing device comprising a cathode, an anode, a gas passage between the cathode and the anode, a gas supply for supplying gas via the gas passage, and a power supply electrically connected to the cathode and the anode for generating a plasma torch, wherein the plasma torch generated is capable of contacting a surface of the propellant charge.

23. The firearm of claim 22, wherein the plasma firing device is integral to the breech.

24. The firearm of claim 22, wherein at least a portion of the plasma firing device is external to the breech.

25. The firearm of claim 22, wherein the power supply comprises a first generator electrically connected to the cathode and the anode for generating an arc across the anode and cathode, and a second generator electrically connected to the cathode and the anode for generating a plasma torch.

26. The firearm of claim 22, further comprising a control switch or trigger, operably connected to the power supply, wherein the plasma torch is generated by activating the power supply through the control switch or trigger.

27. The firearm of claim 22, wherein the activation of the power supply through the control switch or trigger results in the generation of two more plasma torches over a period of time.

28. A firearm capable of firing one or more cartridges, the firearm comprising:

a chamber for accommodating a cartridge;

a bolt head configured to alternate between a forward position and a rearward position in response to the firing of one or more cartridges; and a plasma firing device positioned in the bolt head for generating a plasma torch to detonate the primer of a chambered cartridge, the plasma firing device comprising a cathode, an anode, a gas passage between the cathode and the anode, a gas supply for supplying pressurized gas to the gas passage, and a power supply electrically connected to the cathode and the anode for generating a plasma torch to fire the firearm.

29. The firearm of claim 28, wherein the plasma firing device is integral to the bolt head.

30. The firearm of claim 28, wherein at least a portion of the plasma firing device is external to the bolt head.

31. The firearm of claim 28, wherein the power supply comprises a first generator electrically connected to the cathode and the anode for generating an arc across the gas passage and comprises a second generator electrically connected to the cathode and the anode for generating a plasma torch to fire the firearm.

32. The firearm of claim 28, wherein the plasma torch is generated for a short duration by synchronizing a short pulse of gas from the gas supply with a short pulse of current from the power supply.

33. The firearm of claim 28, wherein the plasma torch is capable of being generated for a short duration by applying a continuous flow of gas from the gas supply and a short pulse of current from the power supply.

34. The firearm of claim 28, wherein the firing rate of the one or more cartridges is controlled by repeatedly generating a plasma torch for a short duration.

35. The firearm of claim 34, wherein the plasma torch is generated once for each operator firing input to fire the firearm in a semiautomatic mode.

36. The firearm of claim 34, wherein the plasma torch is generated a preset number of times for each operator firing input to fire the firearm in burst mode.

37. The firearm of claim 36, wherein the preset number of times can be varied by an operator of the firearm.

38. The firearm of claim 34, wherein each operator firing input causes the plasma torch to be generated at a predetermined time interval until an operator input to cease firing is received.

39. The firearm of claim 38, wherein the predetermined time interval can be varied by an operator of the firearm, thereby allowing operator adjustment of the automatic rate of fire.

* * * * *

UNITED STATES PATENT AND TRADEMARK OFFICE
CERTIFICATE OF CORRECTION

PATENT NO. : 6,805,055 B1  
DATED : October 19, 2004  
INVENTOR(S) : Jan Henrik Jebsen and Gerard Aknine It is certified that error appears in the above-identified patent and that said Letters Patent is hereby corrected as shown below:

Title page,  
Item [57], ABSTRACT,  
Line 1, change "comprised" to -- comprises --.

Column 2,  
Line 65, change "ring" to -- firing --.

Signed and Sealed this

Eighteenth Day of October, 2005

JON W. DUDAS  
*Director of the United States Patent and Trademark Office*